Figure 1:
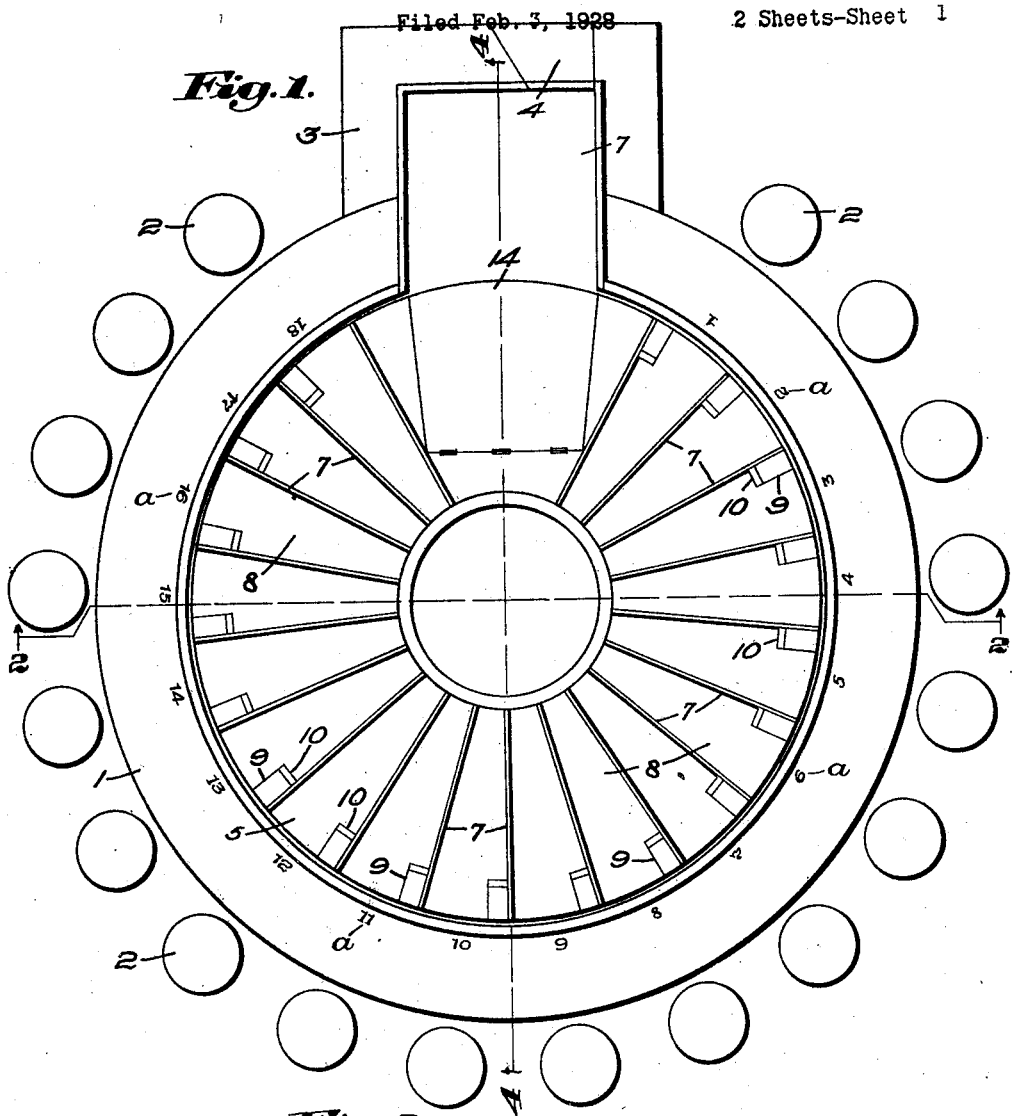

Jan. 15, 1929.  
G. M. KENDALL  
MERCHANDISING DEVICE  
Filed Feb. 3, 1928

1,699,511

2 Sheets-Sheet 1

Inventor:
George M. Kendall

Jan. 15, 1929. 1,699,511
G. M. KENDALL
MERCHANDISING DEVICE
Filed Feb. 3, 1928 2 Sheets-Sheet 2
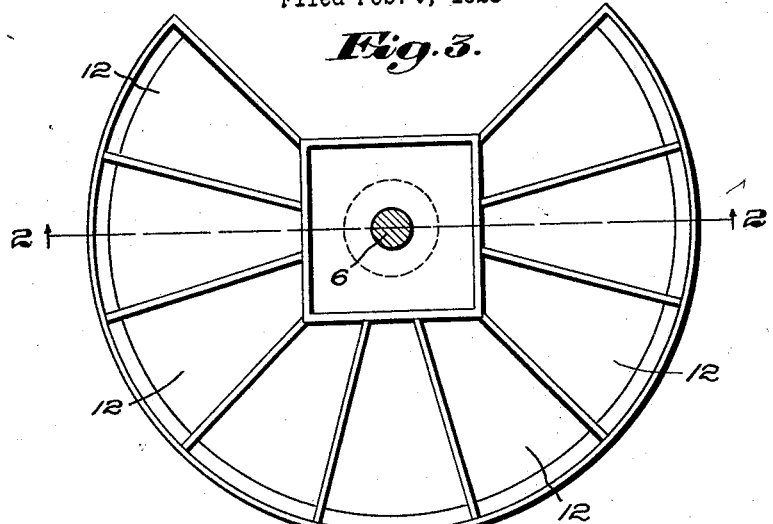
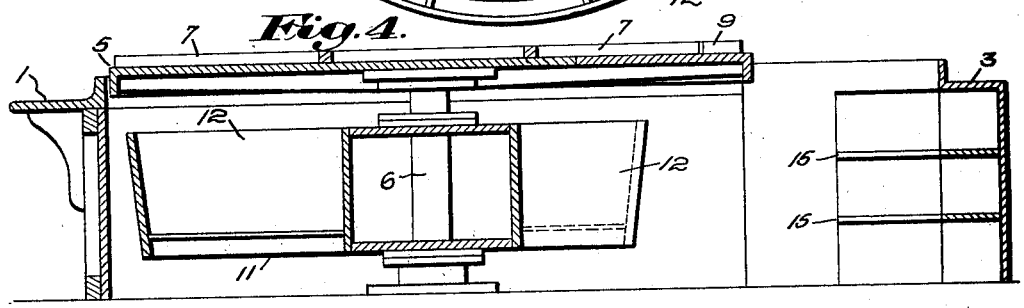
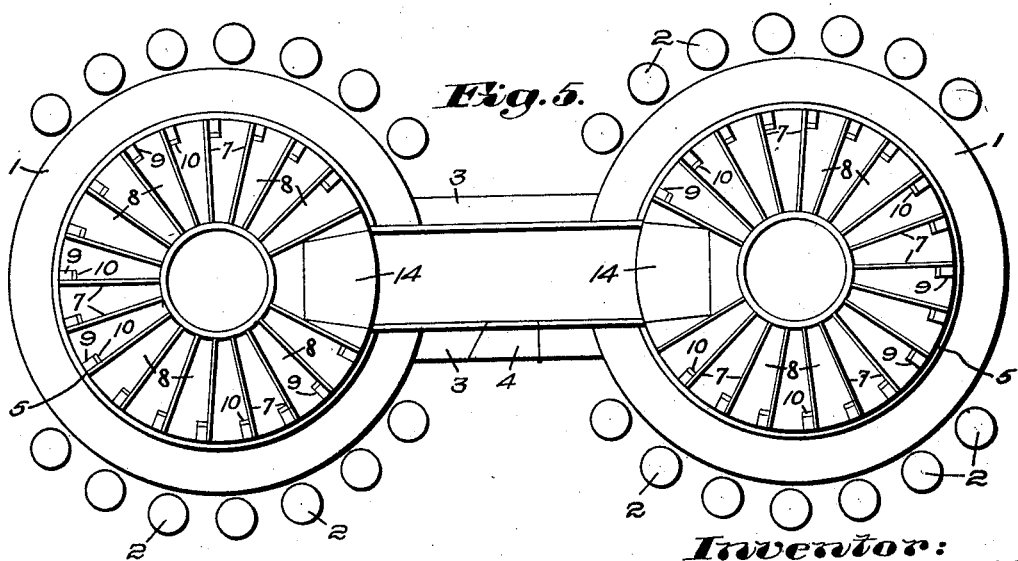
Inventor:
George M. Kendall, Patented Jan. 15, 1929.

1,699,511

UNITED STATES PATENT OFFICE.

GEORGE M. KENDALL, OF BOSTON, MASSACHUSETTS.

MERCHANDISING DEVICE.

Application filed February 3, 1928. Serial No. 251,553.

This invention relates to sales or merchandising devices and particularly to devices or means for serving and selling at retail food products and other merchandise, particularly in lunch rooms and small stores, and its aim is to provide a novel construction having, among others, the advantages hereinafter described and claimed.

Figure 2:
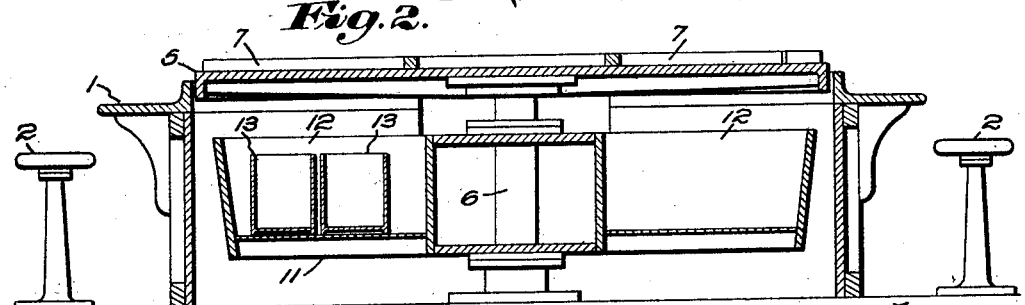

In the drawings of one embodiment of my invention selected for illustration and description herein,

Fig. 1 is a plan;

Fig. 2, a vertical cross section on the line 2—2, Fig. 1;

Fig. 3, a plan of the rotating storage bin;

Fig. 4, a vertical cross section on the line 4—4, Fig. 1, from the right, showing the counter and serving or delivering table and attendant's box with storage bin; and Fig. 5, a plan of a duplex form of my novel food serving device designed for economy of space and labor expenditure for waiters.

Referring to Figs. 1, 2, my invention, here illustrated as embodied in a food serving device, is shown as comprising a curved and preferably circular counter 1 of suitable width and diameter, provided with the usual stools 2 for customers. The counter 1 is provided at a convenient point with an offset section or box 3 for the attendant or waiter. This offset portion of the counter may have a hinged section 4 adapted to swing on hinges to permit entrance to and exit from the box by the attendant. The counter is also marked at suitable points, as opposite each stool 2, with identifying characters $a$ as numbers 1, 2, 3, etc., to identify the seat or position of each customer.

A serving table 5, Figs. 1, 2, is mounted, preferably with ball bearings on a post 6 for rotation by the waiter or customer within the circular counter 2 and preferably slightly above it for convenience. This table is divided radially as by narrow strips of moulding or the like 7 into sectors 8 adapted to hold the dishes or boxes, and merchandise, as food, for the individual customers. Each sector 8 has also a small box 9, or the like, for the menu or other list of goods to be checked by the customer, and a clip or pocket 10 in which the list is placed upright when it is sent to the attendant.

The able 5 also has a hinged section 14 that may be raised by the attendant to permit him to reach any part of the table as hereafter described. Beneath the table, Fig. 2, and preferably separate from it, is also mounted on the post 6 or in any suitable and convenient manner, a rotatable storage or supply bin 11 which, of course, may be divided as desired for convenience into a plurality of compartments 12 of any shape and size to hold products either in bulk or in containers 13. This bin may be cut away at one point to provide space for use of the attendant under certain conditions to be described. By means of this storage bin, a suitable supply of goods can always be kept conveniently at hand.

Beneath the counter 1 and about the box 3, Fig. 4, occupied by the waiter, there are provided also shelves 15 for further convenient storage purposes for merchandise and other necessary equipment.

In use a customer approaches the counter 1 and occupies one of the seats 2. On one of the lists of goods found in the pocket 9 on the table 5 he marks or checks the items of food or other articles wanted, and on it also places the number of his seat or location, as 8, at the counter, and places the list in the upright box or clip 10 on the table in front of him.

On seeing the upright list the attendant rotates the table 5 to bring the customer's list to him and proceeds to fill it from the bins or shelves beneath the table and adjacent his position in the enclosure 3, rotating the bin 11 as may be necessary to bring the required goods to him. The goods required are placed by the attendant on the table 5 within one of the enclosed sectors 8, and the table 5 again rotated until the goods and list are opposite the purchaser who then removes them to a position on the counter in front of him.

When the customer leaves he may stop at the attendant's position near the counter 3 and pay his bill there or at any other place where the cashier may be stationed.

A modified arrangement of my novel merchandise delivering device is as shown in Fig. 5 where two counters are located with one box 3 between them so that at dull times one attendant can care for two counters, and during busy times a separate attendant can be provided for customers at each table.

The advantages of my novel construction are many. By its use the attendant, or salesman, can care for a much larger number of customers than by any other method that I know of. It is direct in its operation, the customer being put directly in touch with the seller or attendant.

By no other method or arrangement that I know of can so large an assortment and supply of goods be provided close at the side of the attendant where he has only to move a step or two to reach any portion of it. This dispatch in serving a customer pleases him, and also means more customers served by one attendant. No complicated mechanism for operating the table or bin is necessary.

When the attendant wishes to collect soiled dishes, should a special dish boy not be employed, or when he wishes to clean crumbs from the rotating table, he need only rotate the table until the hinged section 14 of the table 5 is opposite him, raise it and rotate the storage bin 11 until the cut-away section is opposite him, and then step into said section to enable him to reach any part of the top of the table. If he wishes to reach every part of the counter, he walks around as the table and bin rotate to any desired point within the counter.

This invention is not limited to the particular embodiment thereof described and illustrated herein.

Claims:

1. Merchandise vending device comprising, in combination, a curvilinear counter, a freely rotatable table within the counter, and a rotatable storage bin beneath the table, whereby merchandise may be sent direct from the attendant at a point on the counter to the customer by the table without the attendant leaving his position.

2. Merchandise vending device comprising, in combination, a curvilinear counter with an attendant's box radially positioned thereon, a rotatable table within the counter, and a rotatable storage bin therebeneath whereby merchandise may be sent direct from the attendant to the customer by the table without the attendant leaving the box.

3. Merchandise vending device comprising, in combination, a curvilinear counter, with an attendant's box radially positioned thereon, a rotatable table with a hinged section within the counter, and a rotatable bin with a sector removed therefrom beneath the table whereby merchandise may be collected from the bin and sent direct by the attendant to the customer by the table without the attendant leaving the box.

4. Merchandise vending device comprising, in combination, a curvilinear counter, a freely rotatable table having enclosed sections on its surface within the counter, a rotatable storage bin beneath the table, whereby merchandise may be sent direct from the attendant to the customer by the table without the attendant leaving his position.

5. Merchandise vending device comprising, in combination, a curvilinear counter with identifying numbers thereon, a freely rotatable table having enclosed sections with order list pockets thereon within the counter, said pockets containing numbered order lists corresponding to the number on the counter opposite said enclosed section, a rotatable storage bin beneath the table, whereby an order list may be sent by a customer to the attendant from a given seat number, and the goods returned direct from the attendant to the customer.

In testimony whereof, I have signed my name to this specification.

GEORGE M. KENDALL.